July 7, 1959     W. J. MANN     2,893,436
HORIZONTAL CORRUGATED PAPER TUBE AND METHOD OF MAKING THE SAME
Filed Oct. 12, 1954     4 Sheets-Sheet 1
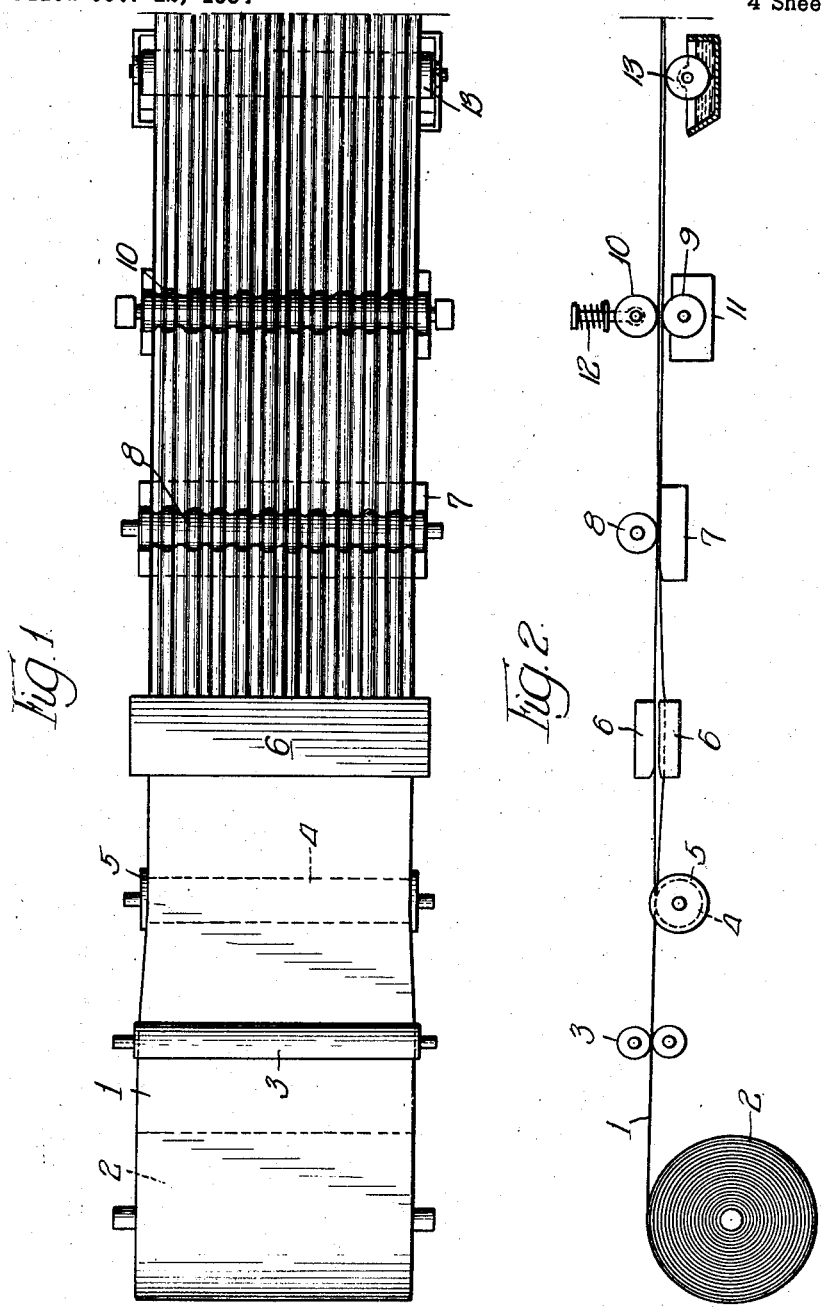
INVENTOR.
Walter J. Mann,
BY George H. Simmons

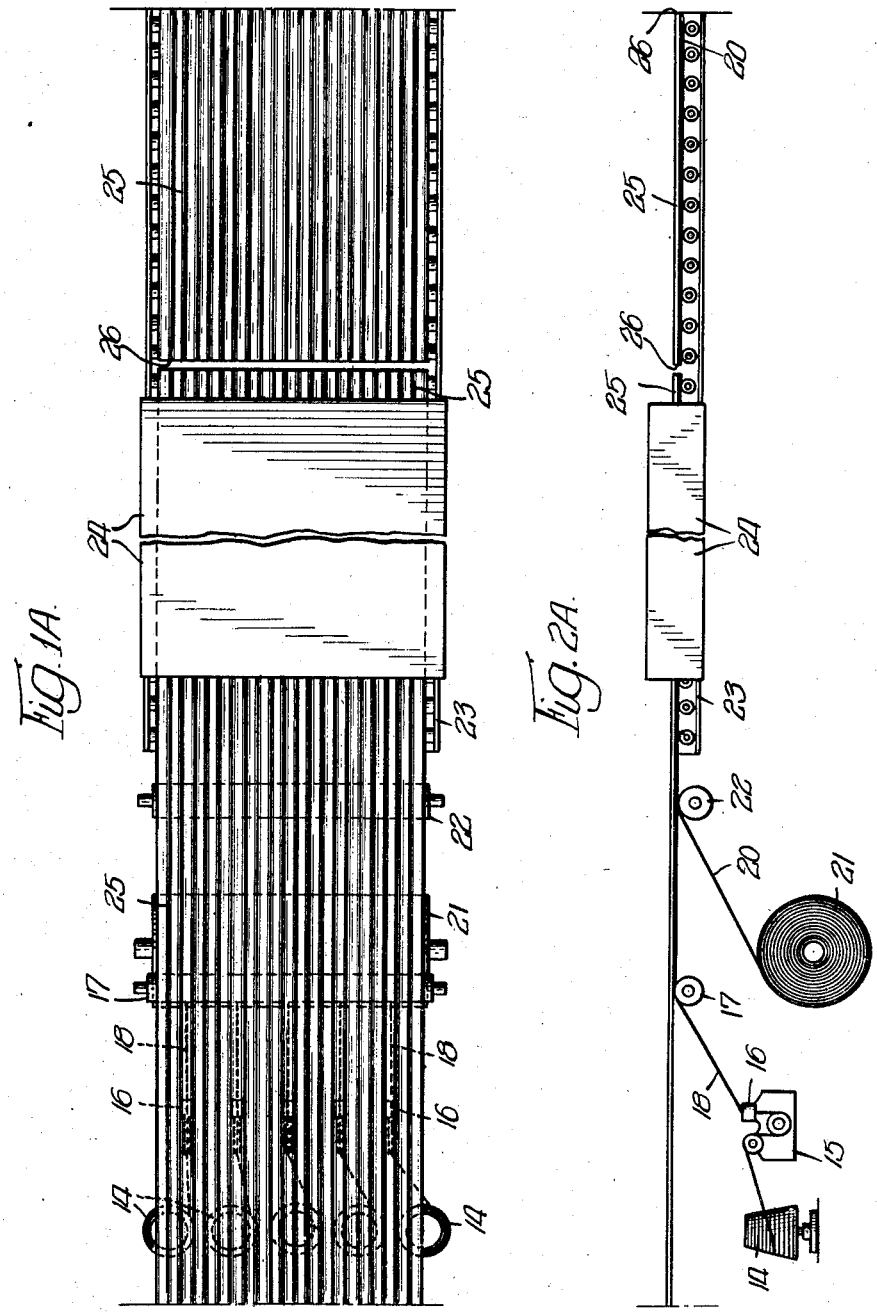

July 7, 1959 W. J. MANN 2,893,436
HORIZONTAL CORRUGATED PAPER TUBE AND METHOD OF MAKING THE SAME
Filed Oct. 12, 1954 4 Sheets-Sheet 3
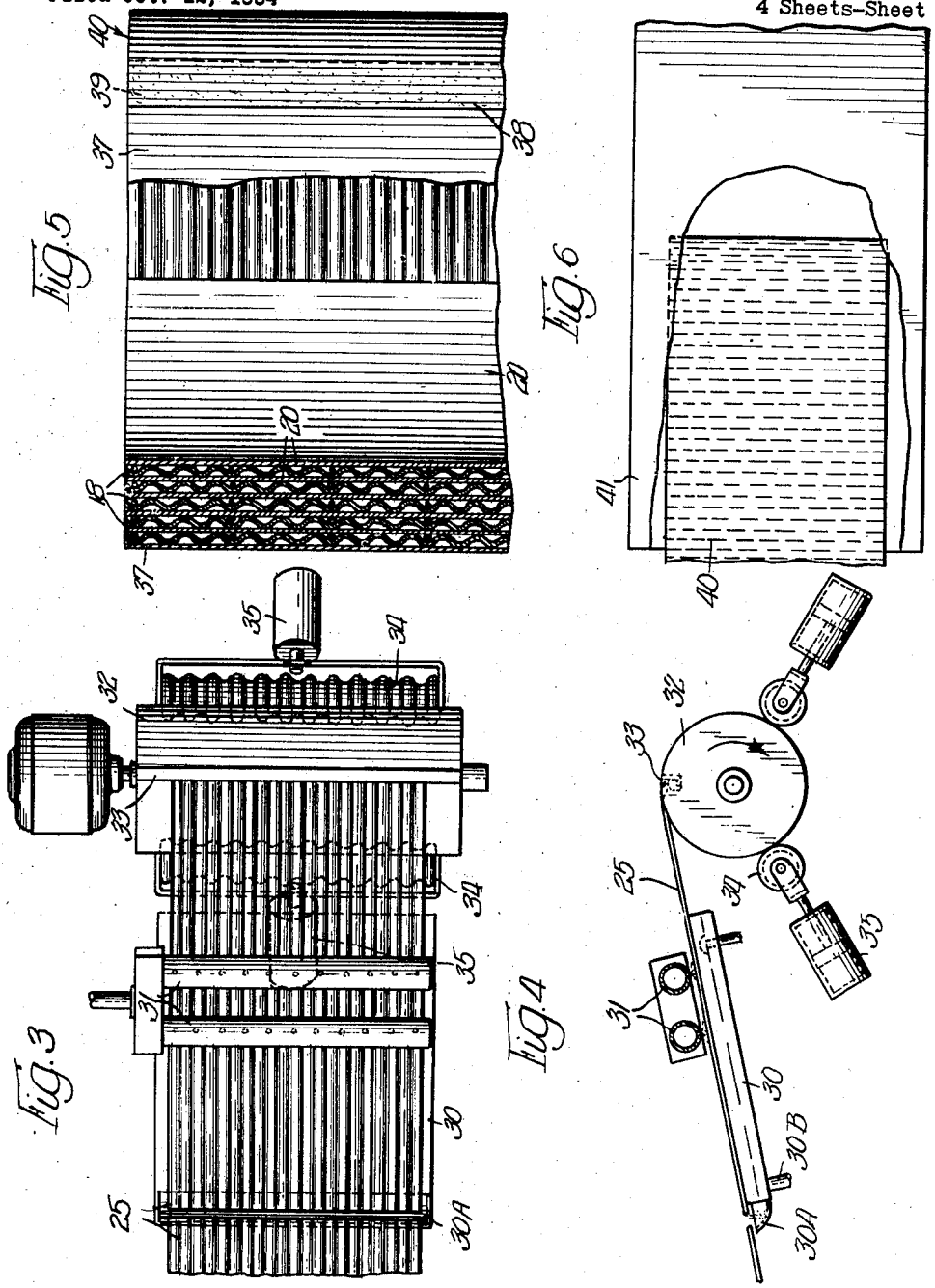
INVENTOR.
Walter J. Mann
BY George H. Simmons
Atty July 7, 1959 W. J. MANN 2,893,436
HORIZONTAL CORRUGATED PAPER TUBE AND METHOD OF MAKING THE SAME
Filed Oct. 12, 1954 4 Sheets-Sheet 4
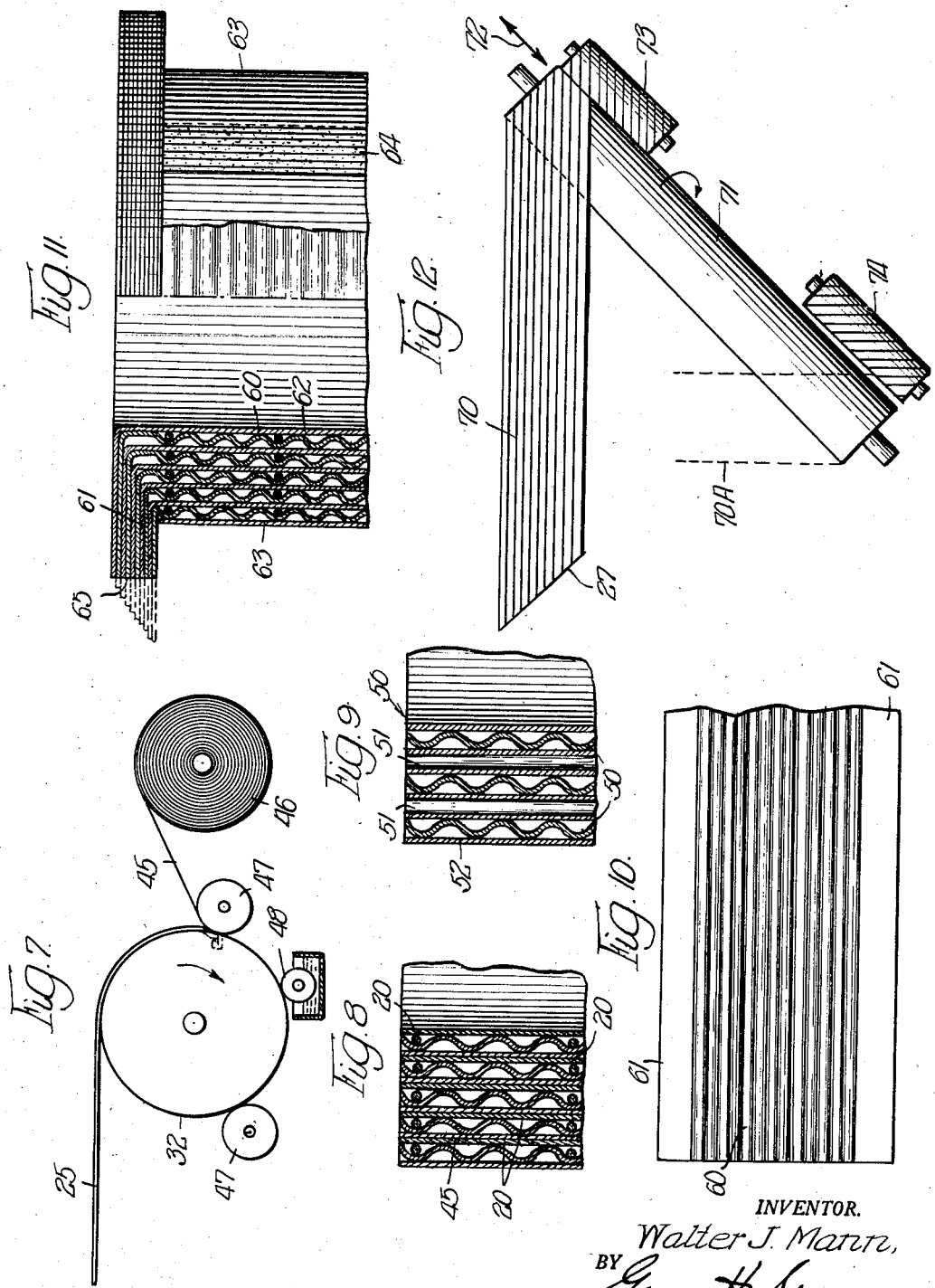
INVENTOR.
Walter J. Mann,
BY George H. Simmons

United States Patent Office 2,893,436
Patented July 7, 1959

2,893,436

HORIZONTAL CORRUGATED PAPER TUBE AND METHOD OF MAKING THE SAME

Walter J. Mann, Mount Prospect, Ill., assignor of one-third to Ephraim H. Roden, Belvidere, and one-third to George C. Ickes, Jr., Evanston, Ill.

Application October 12, 1954, Serial No. 461,858

8 Claims. (Cl. 138—78)

This invention relates to a method of forming corrugated paper tubes and to the tubes so formed.

It is a main object of the invention to provide a method of forming corrugated paper tubes in which the flutes in the corrugated paper extend circumferentially around the tube.

Another object of the invention is to provide a paper tube in which flutes extend circumferentially around the tube.

Another object of the invention is to provide a method of forming single face corrugated board in which the flutes of the fluted ply extend longitudinally of the board and are of sufficient length to permit the formation of large diameter multi-layer tubes in which the flutes extend circumferentially around the tube.

Another object of the invention is to provide a method of forming a single face corrugated board in which the flutes in the fluted ply are spaced inwardly from the edges of the web, leaving at those edges bands of unfluted material that extend longitudinally of the web.

Another object of the invention is to provide a single face corrugated board having reinforcing strands disposed between the fluted and face plies and secured thereto.

Another object of the invention is to provide a method of moistening the exposed flutes of a single face corrugated board sufficiently to render those flutes soft and pliable, which method accomplishes this result while maintaining the glue joints between the fluted ply and facing ply of the board intact.

Further objects of the invention not specifically mentioned here will be apparent from the detailed description and claims which follow, reference being had to the accompanying drawings in which a preferred embodiment of the invention is shown by way of example and in which Figs. 1 and 1A are a plan view diagrammatically illustrating the first steps of the process;

Figs. 2 and 2A are an elevational view diagrammatically illustrating the steps in the process of Figs. 1 and 1A;

Fig. 3 is a plan view illustrating the second group of steps in the process;

Fig. 4 is an elevational view diagrammatically illustrating the steps shown in Fig. 3;

Fig. 5 is a fragmentary view in quarter section of a multi-layer tube made in the manner shown in Figs. 3 and 4;

Fig. 6 is a fragmentary view diagrammatically illustrating drying the tube;

Fig. 7 is a fragmentary view diagrammatically illustrating a modified method of forming a tube;

Fig. 8 is a fragmentary view similar to Fig. 5, showing a tube made in the manner shown in Fig. 7;

Fig. 9 is a view similar to Fig. 8, showing another form of tube made in the manner shown in Fig. 7;

Fig. 10 is a plan view of a modified form of blank;

Fig. 11 is a view similar to Fig. 5, showing a flanged tube made from the blank in Fig. 10;

Fig. 12 is a diagrammatic view similar to Fig. 7, showing the winding of a spiral wrap tube.

Tubes, such as are used in the formation of drums, crates, boxes, and the like, when formed of single face corrugated board, have heretofore invariably had the flutes in the corrugation extending lengthwise of the tube. Such construction has been the necessary result of the manner in which corrugated board has been made heretofore. Present day corrugators move a web of paper between corrugating rolls which form in the web flutes which extend transversely of the web. The length of the flute obtainable is determined by the width of paper obtainable, and in no case, up to the present time, has paper been available in widths greater than twenty feet. Although the width of paper stock available has been limited, its length is practically unlimited, paper being available in rolls thousands of yards long.

The present invention utilizes an entirely different method of forming flutes in a web of paper, the method producing in this web flutes which extend longitudinally of the web rather than transversely, as heretofore. The method of the present invention also permits forming of a single face corrugated board into multi-layer tubes of larger diameter, in which tubes the flutes extend circumferentially around the tube rather than axially thereof, as has been the practice heretofore.

As a result of this improved method, large diameter drums, the walls of which contain a plurality of layers of material, can be formed with the flutes extending circumferentially around the drum. Such drums, when equipped with suitable ends or heads, form a strong receptacle for finely comminuted material, and, when treated with suitable moisture-proof materials, as receptacles for viscous liquids.

The improved method of forming single face corrugated board is further advantageous as it permits reinforcing the board with strands disposed between the fluted ply and the facing ply and secured thereto. Tubes formed from such board are reinforced and consequently are stronger.

The method of the present invention also permits forming tubes of octagonal, hexagonal, or rectangular cross section, as well as of round cross section, in all of which tubes the flutes extend circumferentially around the perimeter of the tubes. Blanks of single face corrugated board, formed in accordance with the teachings of the invention, may be cut from the web on a bias and formed into spiral wrapped tubes in which the flutes extend at approximately 45° with respect to the axis of the tube and in which the flutes in adjacent layers are disposed at right angles to each other in accordance with present day practices in the formation of spiral wrapped tubes.

The invention will be best understood by reference to the accompanying drawings. As will be seen in Figs. 1 and 1A, 2 and 2A, a web 1 is unrolled from a roll of stock 2 and passed between moistening rolls 3 which apply to the web sufficient water to render it soft and pliable. The web then passes over a crowning roll 4 which has flanges 5 at its end engaging the edges of the web to arch the same, thereby to lessen the effective width of the web. The arched web is then preferably passed between heaters 6 that are maintained at a relatively high temperature in any convenient manner, such as by steam, to heat the web and drive from it any excess moisture. The web then engages a die 7, the upper surface of which contains grooves that extend in the direction of travel of the web. A corrugated roller 8 bears down on the web, forcing it into the grooves in the die, thereby to form in the web flutes which are approximately of desired shape. The die 7 and roller 2 are heated in any convenient manner, as by steam, Upon leaving the die 7 and roller 8, the partially fluted web passes between fluted rollers 9 and 10, roll 9 being power driven as indicated at 11, to pull the web, and roll 10 being spring pressed against the web, as indicated at 12. Rolls 9 and 10 are likewise heated and form the flutes into final desired configuration.

The thus fluted web passes over a glue applicator 13 which applies a ribbon of glue to the lowermost portions of the crests of the flutes on the underside of the web.

At this point in the formation of the web into single face corrugated board, a variation is possible. If desired, reinforcing strands, composed of cordage, fiber glass, or even wire, may be unrolled from a suitable source 14, passed through a glue bath 15, and a wiper 16, and over a guide roll 17 into registration with the grooves between the crests on the underside of the web. As will be seen in Fig. 1A, a plurality of strands 18 may thus be brought into registration with the fluted ply. If desired, a strand can be laid in each and every groove on the underside of the web; however, it is contemplated that the strands will be spaced apart a convenient distance, as six or eight inches. The fluted web is then brought into contact with a facing ply 20 that is unwound from a source 21 and passed over a roller 22 that brings it into registration with the underside of the fluted web and with the strands therein. Obviously, if desired, the facing web 20 may be applied directly to the fluted web with the reinforcing strands omitted.

The composite web thus formed rests upon a conveyor 23 consisting of a plurality of rollers, some or all of which may be power driven, as desired. The web passes through a drying oven 24 which is heated to a temperature just below the scorching point of the paper, thereby to dry the glue into the web and to dry the excess moisture therefrom. The length of the oven 24 will, of course, depend upon the speed of travel of the web and length of time required to dry the glue used.

Upon emerging from the oven 24, the web is cut into lengths forming blanks 25, the length of which will depend upon the particular specifications of the tube to be formed therefrom. As shown in Fig. 1A, the web may be severed at right angles to its edges and flutes, as indicated at 26, forming thereby a rectangular blank, or it may be severed at an angle which in Fig. 12 is at 45° to the edge of the web, as indicated at 27, thereby to permit forming a so-called spiral wrapped tube from the blank.

In either case the blank 25 is then moved into registration with a heated inclined table 30, Figs. 3 and 4, with the facing ply 20 downwardly thereon and the fluted ply 1 uppermost. A moistening agent, such as water, is played upon the exposed flutes through suitable perforated pipes 31 in sufficient amounts to thoroughly saturate the exposed flutes. A gutter 30A catches excess water running off of the blank 25 and returns it through pipe 30B to a tank (not shown) where it is collected for future use. The table 30, being maintained at high temperature in any convenient manner as by steam, and being in engagement with the facing web 20 of the blank, maintains the glue joint between the fluted web 1 and the facing web 20 intact, or at least sufficiently intact to prevent movement of the one ply with respect to the other. The blank 25 passes off of the table 30 into engagement with a mandrel 32 to which it is attached by suitable clamping means 33 that engages the forward edge of the blank.

As shown in Figs. 3 and 4, the mandrel is cylindrical, this particular form being shown by way of example as the use of mandrels of octagonal, hexagonal and rectangular configuration is contemplated. The mandrel is power driven, rotating in the direction of the arrow, and the blank 25 is wrapped around the mandrel, being engaged by fluted rollers 34 which are pressed against the mandrel and blank by suitable means, such as pneumatic cylinders 35. The rollers 34 being corrugated register with the valleys between the flutes of the blank and force the blank into intimate engagement with the mandrel without crushing the flutes therein. This bending of the blank around the mandrel stretches the paper in the exposed crests of the flutes. The mandrel 32 and rollers 34 are heated to a temperature just below the scorching point of the blank so that the blank is quickly dried partially at least. In Fig. 4 I have shown two rollers 34; however, I do not intend to be limited to the use of but two rollers as it is contemplated that in certain instances a larger number of rollers will be used.

Rotation of the mandrel 32 continues until the entire blank 25 has been wrapped around it. This rotation may consist of but a single revolution where a single ply tube is being formed, or of a number of revolutions when a multi-layer tube is being formed. In most instances multi-layer tubes will be made. In the formation of multi-layer tubes it is necessary to apply an adhesive to the blank so that the various layers in the tube will be secured together. A suitable adhesive, such as sodium silicate or glue, may be incorporated in the liquid used to moisten the blank and sprayed thereon through the pipes 31.

After the desired number of layers have been wound on the mandrel, fluted rolls 34 are retracted and a facing ply applied to the tube. As will be seen in Fig. 5, the facing ply 37 encircles the tube and is lapped, as shown at 38, with a band of glue 39 in the lap. In Fig. 5, the tube is shown to have five layers each disposed with the face ply 20 innermost of the fluted ply 1. The reinforcing strands 18 are shown in every fourth flute. If desired, the facing ply 37 may contain printed matter.

The tube 40 is stripped from the mandrel and placed upon a conveyor that carries it through a drying oven 41 that dries it down to commercial dryness and sets the glue. Ordinarily the facing ply 37 will hold the tube in shape during drying although suitable clamps, not shown, may be used if desired.

In certain instances it may be desirable to incorporate in the tube an additional web and, as will be seen in Fig. 7, to accomplish this as the blank 25 is being wound around the mandrel 32, a second web 45 is unrolled from a source 46 and passed over a roller 47 into engagement with the blank 25. The web 45 may be a plain paper or it may be a single face corrugated board with the flutes extending transversely of the web. Rollers 47 will preferably be plain cylindrical rolls when the web 45 is planar or is single face corrugated board with the facing ply engaging the roll. In instances where a single face corrugated board is used in reverse position, that is with the flutes therein engaging the rollers 47, these rollers will necessarily have to be fluted to register with the flutes in the web. In the formation of multi-ply tubes, as shown in Fig. 7, an additional glue applicator 48 may be used to apply glue to the outer surface of the web 45 in the tube.

Fig. 8 illustrates a multi-web five layer tube in which the facing ply 20 lies innermost in each layer and the web 45 is disposed on the outer face of the fluted ply 1. As shown in this figure, the web 45 is planar.

In Fig. 9, I have shown a five layer two-web tube in which the horizontally fluted web 50 forms three layers and the vertically fluted web 51 forms two layers. An outer planar face ply 52 completes the tube.

As will be seen in Fig. 10, it is not necessary to form flutes 60 entirely across the web, but by suitable formation of the die 7 and rollers 8, 9 and 10, a band 61 of unfluted stock may be left at each edge of the web alongside of the longitudinally extending flutes. Fig. 11 shows a tube formed by winding a web of the type shown in Fig. 10 around the mandrel in the hereinbefore explained manner. As will be seen in this figure, the flutes 60 extend around the tube. The bands 61 and portions of the facing ply 62 registered therewith are formed as flanges projecting outwardly of the tube. Reinforcing strands such as 18 may be incorporated. As shown in Fig. 11, the tube consists of five plies formed by revolving the mandrel through five revolutions as the blank is wrapped thereon. In Fig. 11, I have also shown a facing ply 63 which is planar and may contain printing indicating the contents of the tube. The facing ply may be applied to the tube during the formation thereof or thereafter as desired, and is lapped and glued as shown at 64, but this ply preferably is not extended into the flange. In the formation of a flanged tube of this type, the staggered outer edge of the flange is preferably cut along the line 65 so that the flange terminates in a single plane. The flange so formed enables attaching ends or heads to the tube in any convenient manner, such as by gluing, stapling or nailing.

In Fig. 12, I have illustrated winding a spiral wrap tube. In this procedure the blank 70 is cut with its ends at an angle of 45°, as indicated at 27, and the mandrel 71 is mounted for rotation in the direction of the arrow and for simultaneous axial movement as indicated at 72. Diagonal fluted roll 73 rotates with the mandrel to press the blank against the mandrel. When the desired length of tube has been wound, roll 73 is backed off, roll 74 brought in, the axial movement of the mandrel reversed, and a second blank 70A wound on the mandrel from the end at which blank 70 finished towards the opposite end thereof. This cycle is repeated until a desired thickness of tube is obtained. The flutes in the layers are crisscrossed, and an exceptionally strong tube results. Blanks 70 and 70A can be reinforced with strands such as 18, as in the other blanks.

From the foregoing it will be apparent that the method of the present invention is flexible and capable of being used in the formation of a variety of types of tubes. The essential characteristic of the article so formed is that the so-called horizontal flute therein is stretched at its outer extremity with the result that when dried down to commercial dryness the single face corrugated board used possesses great rigidity and strength. The method permits reinforcing corrugated board with strands which add materially to the strength of the article. The articles can be formed in any one of a number of cross sectional shapes depending upon the shape of the mandrel around which they are formed. The tubes so formed can be flanged if desired and can be made of any length within the range of length of mandrel and width of paper stock available. In the case of spiral wrapped tubes, any width of paper that is available may be used.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What I claim is:

1. The method of forming tubes from paper stock which comprises: moving a web of paper longitudinally; moistening the moving web; forming in the web flutes which extend longitudinally of the web; applying glue to the crests of the flutes on the underside of the web; registering a second moving web of paper with the crests of the flutes on the underside of the first web; applying heat to the webs to dry the glue therein; cutting the webs into blanks of predetermined length; moistening the upper flutes and simultaneously applying heat to the second web to maintain intact the glue joints in the blank; forming the blank into a tube in which the facing ply is innermost and the fluted ply outermost and stretched around the perimeter of the tube at right angles to the axis thereof; and applying heat to the tube to dry the same down to commercial dryness and to dry the glue therein.

2. The method of forming tubes from paper stock which comprises: moving a web of paper longitudinally; moistening the moving web; forming in the web flutes which extend longitudinally of the web; applying adhesive to the lower crests of the flutes on the underside of the web; applying adhesive to reinforcing strands; registering the strands with certain grooves between adjacent crests of the flutes on the underside of the web; applying a second web of paper to the lower crests of the flutes on the underside of the web; applying heat to the web to dry the same and to set the adhesive; cutting the web into sheets of predetermined length to form blanks; moistening the upper crests of the flutes in the blanks and simultaneously applying heat to the facing ply to maintain intact the glue joints between the lower flutes and facing ply; forming the blank into a tube with the moistened flutes outermost and extending circumferentially around the tube at right angles to the axis thereof; and applying heat to the tube to dry the same down to commercial dryness and to dry the glue therein.

3. The method of forming tubes from paper stock which comprises: moving a web of paper longitudinally; forming in said web flutes which extend longitudinally of the web; applying adhesive to the underside of the flutes; Applying adhesive to reinforcing strands; registering said strands with certain of the flutes on the underside of the web; applying a second web to the underside of the flutes and reinforcing strands; applying heat to dry the adhesive; cutting the reinforced web so formed into blanks of predetermined length; applying moisture to the blank to saturate the upper crests of the flutes and simultaneously applying heat to the facing web to maintain intact the glue joints between the lower crests, reinforcing strands and facing web; forming the blank into a tube with the saturated flutes outermost and extending circumferentially around the tube at right angles to the axis thereof; and applying heat to the tube to dry the same down to commercial dryness and to dry the glue therein.

4. The method of forming tubes from paper stock which comprises: moving a web of paper longitudinally; moistening the moving web; forming in the web flutes which extend longitudinally of the web; applying glue to the lower crests of the flutes on the underside of the web; applying glue to reinforcing strands; registering the strands with grooves between adjacent lower crests on the underside of the web; registering a second web with the strands and crests on the underside of the web; applying heat to dry the web and to set the glue therein; cutting the web into blanks of predetermined length; applying a liquid adhesive to the fluted side of the blank to soften the upper crests and simultaneously applying heat to the second web to maintain intact the glue joints in the blank; forming the blank into a tube with the flutes outermost and stretched circumferentially around the tube; registering a third web with the exposed flutes and forming the same into the tube simultaneously with the forming of the blank therein; and applying heat to the tube to dry the same down to commercial dryness and to set the glue therein.

5. The method of forming tubes from paper stock which comprises: moving a web of paper longitudinally; moistening the moving web; forming in the web flutes which extend longitudinally thereof and are spaced inwardly from the edges of the web to leave bands of plain paper along those edges; applying glue to the lower crests of the flutes or the underside of the web, and to the undersides of said bands; applying glue to reinforcing strands; registering the strands with certain of the grooves between adjacent crests of the flutes on the underside of the webs; applying a second web to the lower crests of the flutes, to the reinforcing strands, and to the bands on the underside of the web; applying heat to the web to dry the same and to set the glue; cutting the reinforced single face corrugated so formed with blanks of predetermined length; moistening the upper flutes of the blanks and simultaneously applying heat to the second web to maintain intact the glue joints in the blank; forming the blank into a tube with the flutes outermost and stretched circumferentially around the tube; forming said bands into flanges disposed at substantially right angles to the walls of the tube; and applying heat to the tube to dry the same down to commercial dryness and to dry the glue therein.

6. A fiberboard tube the walls of which consist of a plurality of layers of single face corrugated board disposed with the facing ply inwardly of the tube and the fluted ply outwardly thereof, with the flutes extending around the perimeter of the tube, said fluted ply having unfluted bands at its edges alongside the flutes; reinforcing strands disposed in the grooves between the fluted and facing plies and extending around the perimeter of the tube; and flanges on said tube formed of the unfluted bands of the fluted ply and the portions of the facing ply registered therewith, which flanges extend at substantially right angles to the walls of the tube.

7. A large diameter multi-layer tube consisting of a first continuous sheet of longitudinally fluted single face corrugated board extending around the tube layer upon layer, with the facing ply disposed inwardly and the flutes thereof disposed outwardly, and extending around the perimeter of the tube and at right angles to the axis thereof; reinforcing strands disposed between certain of the flutes and facing ply of said board; a second continuous sheet of material extending around the tube layer upon layer, with each layer interposed between a pair of adjacent fluted layers, each of said layers being affixed to the adjacent layer with which it is in contact.

8. A large diameter tube consisting of a plurality of layers of fluted material spiraled layer upon layer, with the flutes extending spirally around the tube and with the flutes in alternate layers disposed at right angles to flutes in the intervening layers, and a plurality of layers of another material disposed one layer between each pair of adjacent fluted layers, each of said layers being fixed to the layers with which it is in contact.

References Cited in the file of this patent

UNITED STATES PATENTS

| | | |
|---|---|---|
| 663,438 | Hinde | Dec. 11, 1900 |
| 726,894 | Ferres | May 5, 1903 |
| 1,090,593 | Bolger | Mar. 17, 1914 |
| 1,319,455 | Bartlett | Oct. 21, 1919 |
| 1,817,061 | Bobrick | Aug. 4, 1931 |
| 2,084,922 | Sidebotham | June 22, 1937 |
| 2,406,051 | Weiss | Aug. 20, 1946 |
| 2,434,465 | Marc | Jan. 13, 1948 |
| 2,494,431 | Eckstein | Jan. 10, 1950 |
| 2,604,424 | Mathes | July 22, 1952 |

FOREIGN PATENTS

| | | |
|---|---|---|
| 332,979 | Germany | Oct. 7, 1919 |